(12) United States Patent
Pezzano et al.

(10) Patent No.: US 6,708,395 B2
(45) Date of Patent: Mar. 23, 2004

(54) DEVICE AND METHOD FOR INSTALLING TURBINE GENERATOR STATOR WEDGES

(75) Inventors: Leonard Pezzano, Atlanta, GA (US); Alan Michael Iversen, Clifton Park, NY (US); William Gene Newman, Scotia, NY (US); Kenneth John Hatley, Madison, NJ (US); Richard Michael Hatley, Madison, NJ (US)

(73) Assignee: General Electric Company, Schenectady, NY (US)

( * ) Notice: Subject to any disclaimer, the term of this patent is extended or adjusted under 35 U.S.C. 154(b) by 117 days.

(21) Appl. No.: 10/022,827

(22) Filed: Dec. 20, 2001

(65) Prior Publication Data

US 2002/0112345 A1 Aug. 22, 2002

Related U.S. Application Data

(63) Continuation-in-part of application No. 09/699,814, filed on Oct. 30, 2000, now Pat. No. 6,421,914.

(51) Int. Cl.⁷ .................................................. B23P 19/00
(52) U.S. Cl. ............................. 29/732; 29/252; 29/256
(58) Field of Search .......................... 29/728, 732, 734, 29/256, 266, 598, 252, 270, 822, 824; 310/214, 254

(56) References Cited

U.S. PATENT DOCUMENTS 6,584,680 B2 * 7/2003 Iversen et al. ................. 29/732

* cited by examiner

Primary Examiner—I Cuda Rosenbaum
(74) Attorney, Agent, or Firm—Nixon & Vanderhye P.C.

(57) ABSTRACT

A tool for driving a stator slide under a stator wedge within a radial slot of a stator core includes a frame including a pair of elongated rail members, the frame provided with a pair of handles at respective opposite ends of the elongated rail members. A force application cart is located between the rail members, the force application cart having a drive block thereon. A drive is connected to the frame, substantially intermediate opposite ends of the frame, the drive having an on/off trigger located on one of the handles. A lead screw is threadably engaged at one end with the force application cart and connected at an opposite end to the drive such that the drive rotates the lead screw when actuate; wherein in use, rotation of the lead screw causes axial movement of the force application cart and the drive block along the elongated rail members.

16 Claims, 5 Drawing Sheets

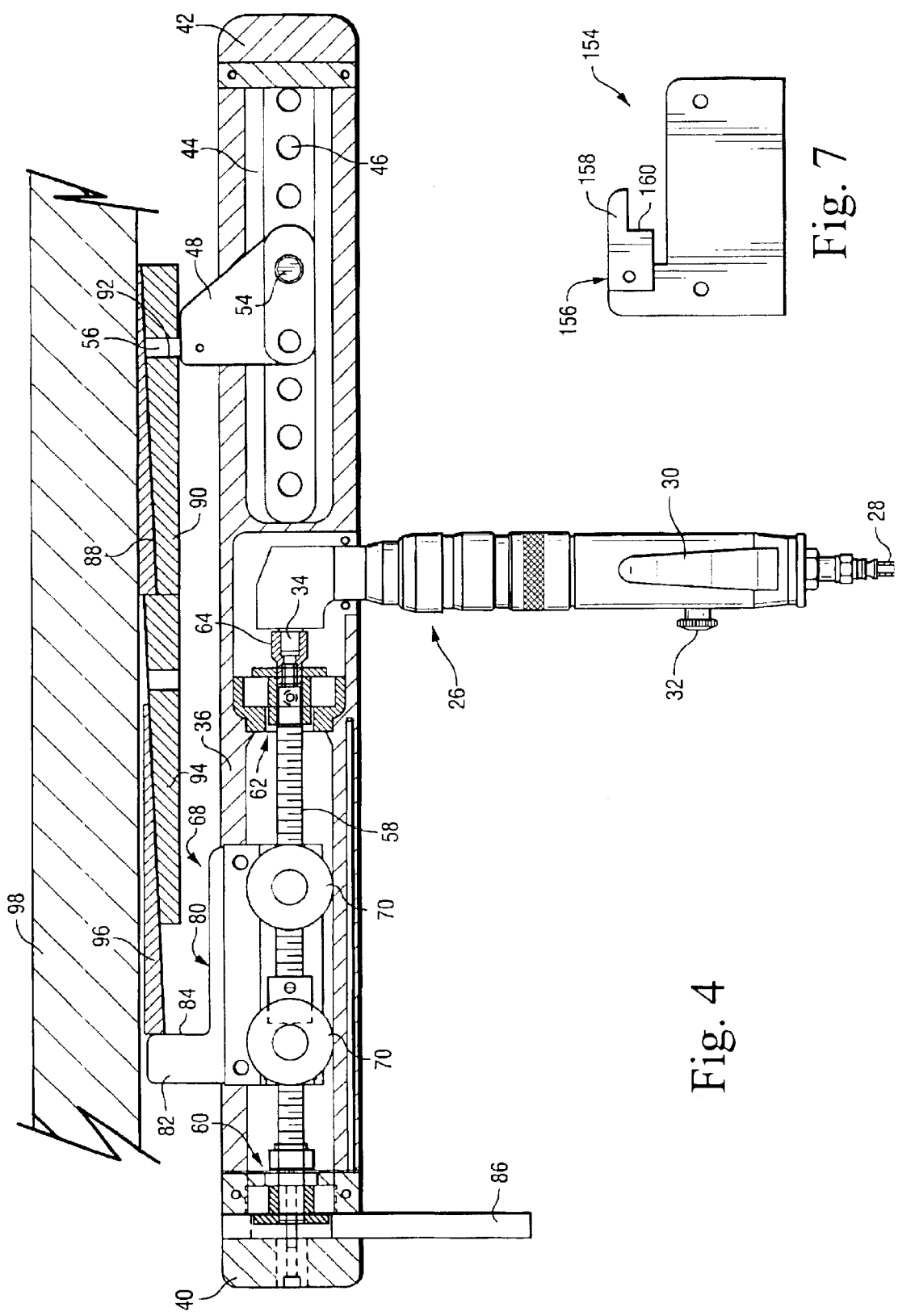

DEVICE AND METHOD FOR INSTALLING TURBINE GENERATOR STATOR WEDGES

This is a continuation-in-part of application Ser. No. 09/699,814 filed Oct. 30, 2000 now U.S. Pat. No. 6,421,914. This application relates to turbomachinery and, in particular, to an air operated screw jack device for installing a tapered wedge slide under a tapered dovetail stator wedge in the stator core of a turbine generator.

BACKGROUND OF THE INVENTION

Magnetic stator cores for turbine generators typically include radially oriented slots that extend axially along the length of the core. Armature windings are seated within the slots and are held in place by a slot support system that includes tapered stator dovetail wedges and slides, various solid and conforming fillers, and a top ripple spring. These support components are employed in order to maintain the stator armature windings in a radially tight condition within the slots. The tapered dovetail wedges are received within axial dovetail slots on opposite side walls of the radial slots. During the process of tightening the stator wedges, it is necessary to install a complementary-shaped, tapered wedge slide against each stator wedge. For the sake of convenience, reference will be made herein to "stator wedges" that are seated in the dovetail slots and "stator slides" that are used to tighten the wedges. The stator slide is pre-gauged and pre-sized to have a significant interference fit relative to the slot contents, i.e., the windings, fillers and ripple springs. The force required to install the stator slide may be several thousand pounds.

Several methods have been used to provide force required to install the stator slides. For example, stator slides have been manually installed using a drive board and a large hammer, and using a modified pneumatically operated riveting gun. These methods, however, are time consuming and place considerable strain on the operator. They also subject the operator to the risk of repetitive motion injury and/or hearing damage, and pose a risk to the integrity of the stator core and armature windings.

BRIEF DESCRIPTION OF THE INVENTION

This invention provides a new user-friendly stator slide driver device that provides a smooth, controlled, non-impacting stator slide assembly technique, with significant reduction or elimination of the aforementioned risks.

More specifically, this invention provides a stator slide driver tool that utilizes a predisposed hole in an adjacent already tightened stator wedge to provide the reaction point for the stator slide driving force. In one exemplary embodiment, a commercially available air wrench is secured to a tool frame and utilized to drive a lead screw which, in turn, causes a force application cart, mounted for movement along elongated rails of the tool frame, to move axially in one of two directions, depending on the direction of rotation of the lead screw. The tool includes an adjustable pin, spaced axially from the cart, and adapted to be received in a hole in the adjacent and already tightened stator wedge. In use, the cart is located so that an upstanding flange of a drive block abuts the rearward end of a stator slide loosely located under a stator wedge adjacent an already tightened stator wedge in which the pin is inserted. Actuation of the air wrench will cause the cart and its force application flange to drive the stator slide under the stator wedge, without repetitive impact, to thereby tighten the wedge, using the adjacent already tightened wedge as a force reaction point.

In a preferred embodiment of the invention, triggers for actuating and operating the air wrench are located on the respective handles provided at opposite ends of the elongated rails. Specifically, a first trigger on one of the handles is an on/off device while a second trigger on the other of the handles is a forward/reverse device. Both triggers incorporate pneumatic valves that control their respective functions. This arrangement allows the tool to be utilized by a single operator.

Another feature of the invention includes the provision for a 90° swivel fitting connecting an air supply hose to the air wrench. The swivel fitting rotates a full 360°, thus allowing the operator to move the hose as necessary to avoid interference, e.g., to have the fitting point down and away from the operator during the wedge tightening process.

Accordingly, in one aspect, the present invention relates to a tool for driving a stator slide under a stator wedge within a radial slot of a stator core comprising a frame including a pair of elongated rail members, the frame provided with a pair of handles at respective opposite ends of the elongated rail members; a force application cart located between the rail members, the force application cart having a drive block thereon; a drive connected to the frame, substantially intermediate opposite ends of the frame, the drive having an on/off trigger located on one of the handles; and a lead screw threadably engaged at one end with the force application cart and connected at an opposite end to the drive such that the drive rotates the lead screw when actuated; wherein, in use, rotation of the lead screw causes axial movement of the force application cart and the drive block along the elongated rail members.

In another aspect, the invention relates to a tool for driving a stator slide under a stator wedge within a radial slot of a stator core comprising a frame including a pair of elongated rail members, the frame provided with a pair of handles at respective opposite ends of the elongated rail members; a force application cart located between the rail members, the force application cart having a drive block thereon; an air wrench connected to the frame, substantially intermediate opposite ends of the frame, the air wrench having an on/off trigger located on one of the handles; and a lead screw threadably engaged at one end with the force application cart and connected at an opposite end to the air wrench such that the air wrench rotates the lead screw when actuated; wherein, in use, rotation of the lead screw causes axial movement of the force application cart and the drive block along the elongated rail members; and further including an air hose for supplying air to the air wrench, wherein the hose is connected to the air wrench with a swivel fitting.

BRIEF DESCRIPTION OF THE DRAWINGS

FIG. 4 is a side elevation illustrating the interaction between the wedge driver tool and stator wedge and slide components in accordance with an exemplary embodiment of the invention;

FIG. 7 is a side elevation of an alternative drive block for use with the tool shown in FIGS. 1–6.

DETAILED DESCRIPTION OF THE INVENTION

Figure 1:
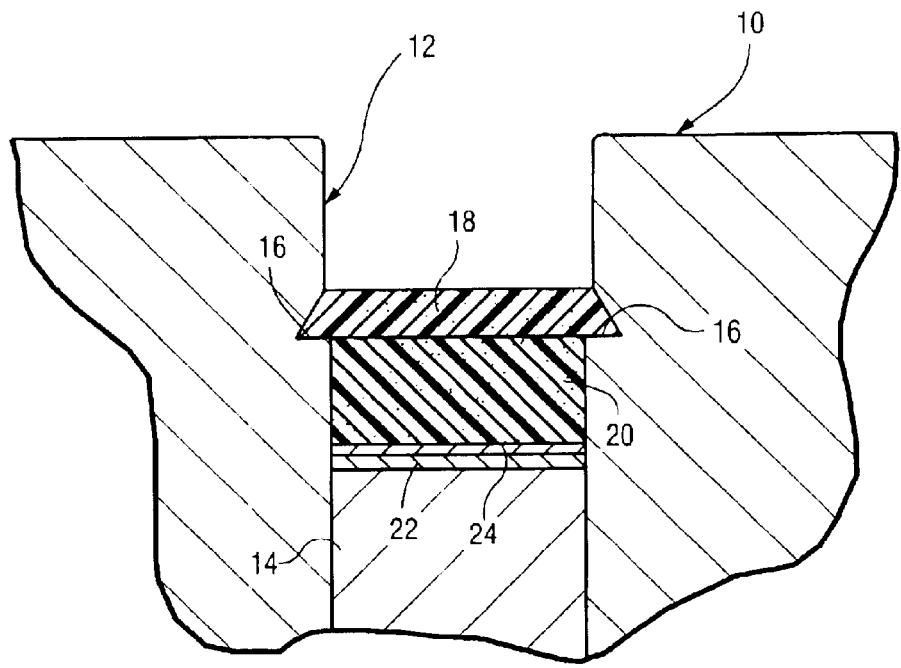
FIG. 1 is a partial axial section view of a stator core slot with conventional stator slide and stator dovetail wedge components in place.

Referring to FIG. 1, a magnetic stator core for a turbine generator is partially shown at 10. A plurality of radially oriented slots 12 extend axially along the stator, with armature windings 14 seated therein. Each slot 12 is formed adjacent its mouth with a dovetail groove or undercut 16 in opposed side walls of the slot, permitting several stator wedge and slide components 18, 20 to be inserted in an axial direction along the length of the slot. In this regard, the individual stator wedges and slides are generally between about 3 and 12 inches in length, and the stator core may have a length of between about 50 and 350 inches.

It will be understood that flat filler strips 22 and ripple springs 24 may be disposed between the windings and the stator wedges and slides as shown in FIG. 1, but these components have been omitted from FIG. 4 for the sake of clarity.

This invention relates to an air operated screw jack for installing the stator slide 20 under the mating stator wedge 18 to thereby apply radially inwardly directed forces on the windings 14 within the stator slot, and to a related method of tightening a stator wedge.

Figure 3:
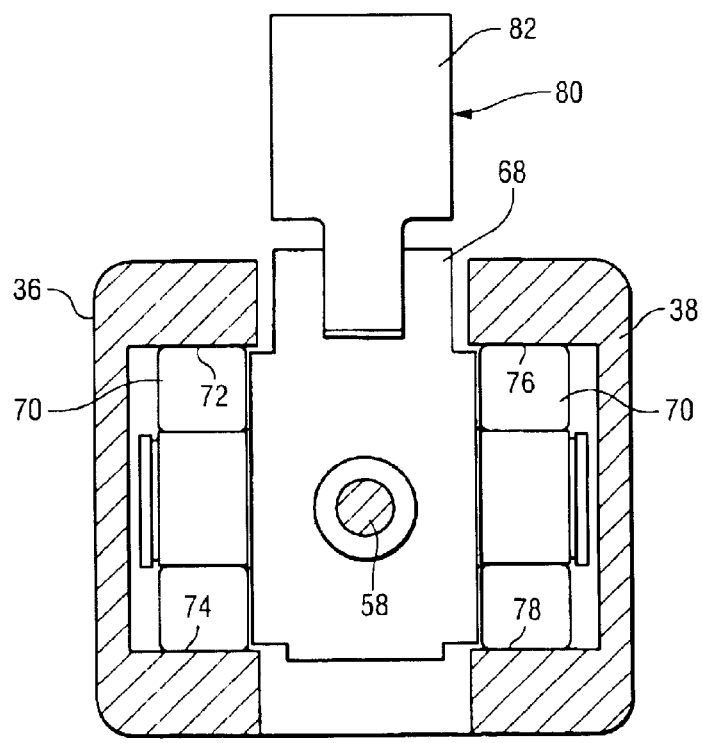
FIG. 3 is an end view of the wedge drive device shown in FIG. 2.
Figure 2:
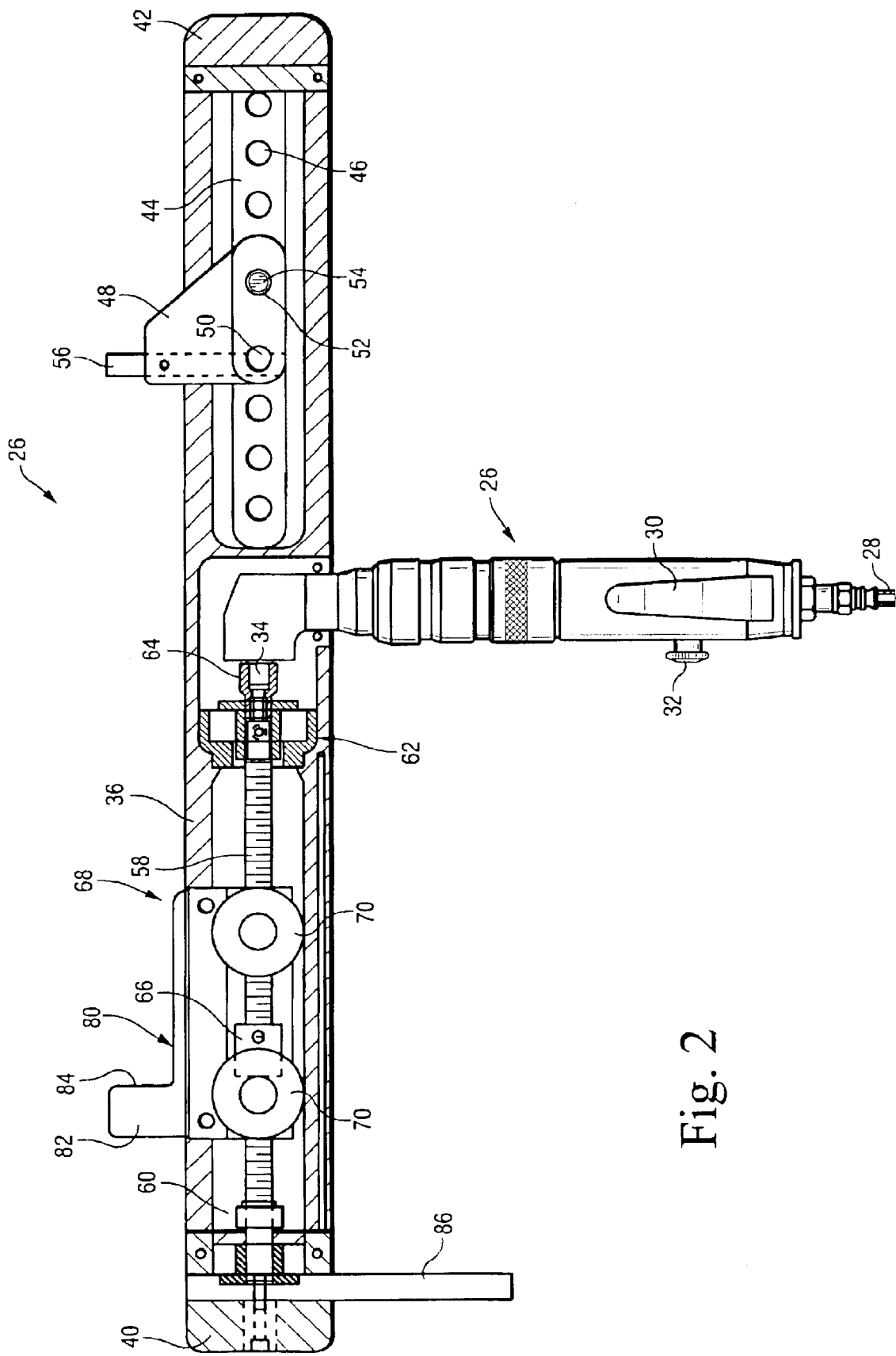
FIG. 2 is a side elevation of a wedge driving tool, with one side frame member removed, in accordance with an exemplary embodiment of the invention.

With reference now to FIGS. 2–4, the wedge slide driving tool 26 is a pneumatic tool that may be any suitable commercially available air powered wrench 27. The air wrench includes an air inlet 28, an actuator lever 30, a reverse button 32, and a rotatable hexagon head 34 oriented substantially perpendicularly to the body of the air wrench.

The air wrench 27 is attached at its operative end to a pair of elongated side frame or rail members 36, 38 that are secured together at opposite ends by suitable fasteners and end caps 40, 42.

To one side of the wrench, a pin locator rail 44 is fixed between the side frame members 36, 38, the pin locator rail 44 having a plurality of locator holes 46 axially spaced along the length thereof. A pin block 48 is mounted for sliding movement along the rail 44, the pin block 48 having a pair of holes 50, 52 therein, but note that the axial spacing between the holes 50, 52 is not the same as the corresponding spacing between the locator holes 46 in the rail. As a result, only one of the two holes 50, 52 in the pin block 48 is alignable at any given time with any one of the holes 46 in the rail 44. This arrangement allows greater flexibility in adjusting the axial location of the pin block. When correctly located, a locking pin 54 is inserted into the aligned holes to thereby lock the pin block 48 relative to the frame members 36, 38. The pin block 48 is formed with a pin member 56 projecting from the top of the pin block. Adjustment of the pin block 48 allows the tool to be used with stator wedge and slide components of varying lengths.

On the other side of the air wrench 27, a lead screw 58 is fixed between a pair of thrust bearings 60, 62, the lead screw 58 having a conventional wrench socket 64 at one end thereof, adapted to fit onto the head 34 of the air wrench. The lead screw 58 is threadably engaged with a lead nut 66 fixed to a force application cart 68. The cart itself is provided with four wheels 70 by which the cart moves axially in opposite directions between the side rail members 36, 38. It will be appreciated that when the lead screw 58 is rotated, the cart will move along the lead screw in one of two opposite directions, depending on the direction of rotation of the lead screw, between opposed surfaces 72, 74 and 76, 78 of rails 36, 38, respectively, as best seen in FIG. 3.

A force application drive block 80 is secured to the drive cart. The drive block 80 is formed with an upstanding flange 82 having a vertical drive face 84 that is adapted to engage the face of a stator slide as described further below. The stator slide driver tool also includes a handle 86 which facilitates manipulation of the tool.

With reference to FIG. 4, the placement of stator wedge and slide components within the radially inner portion of a stator slot is illustrated with slot surfaces removed for the sake of clarity. Note that the slot orientation in FIG. 4 is 180° from that shown in FIG. 1. Specifically, a first stator wedge 88 and a first stator slide 90 are shown in a fully tightened position within the slot (there are also additional wedge and slide components inwardly, i.e., to the right, of those illustrated). It will be appreciated that the stator armature bars are thus tightly held within the radial core slots by means of the combined stator wedge and slide components, which extend axially along the length of the core slots. The various stator wedges each include a hole or aperture 92 adapted to receive the locating pin 56 of the stator slide driver tool 26. With this first pair of stator wedges and slides 88, 90 fully inserted and tightened, a second stator wedge 94 is loosely loaded into the stator core slot, utilizing the integral dovetail grooves formed in the sidewalls of the slot. The stator slide 96 to be tightened is then loosely inserted between the stator wedge 94 and the windings generally shown at 98. Thereafter, the locating pin 54 of the stator slide driver tool 26 is inserted within the hole 92 in the already tightened stator wedge 90, and the force application cart 68 is located such that the vertical drive face 84 of the force application flange 82 abuts the axially outer face of the stator slide 96.

When the air wrench 27 is actuated so as to rotate the lead screw 58 in the appropriate (i.e., forward) direction, the force application cart 68 will move axially in a tightening direction, such that the drive face 84 engages the outer face of the stator slide, driving it axially inwardly between the stator wedge 94 and the windings 98, with the locating pin 54 in the adjacent stator wedge 90 utilized as a force reaction point. Actuation of button 32 causes the lead screw to rotate in a reverse direction, enabling the tool to be re-set for the next wedge and slide assembly. The process is repeated for the remaining wedge and slide pairs to be inserted in the slot.

Figure 5:
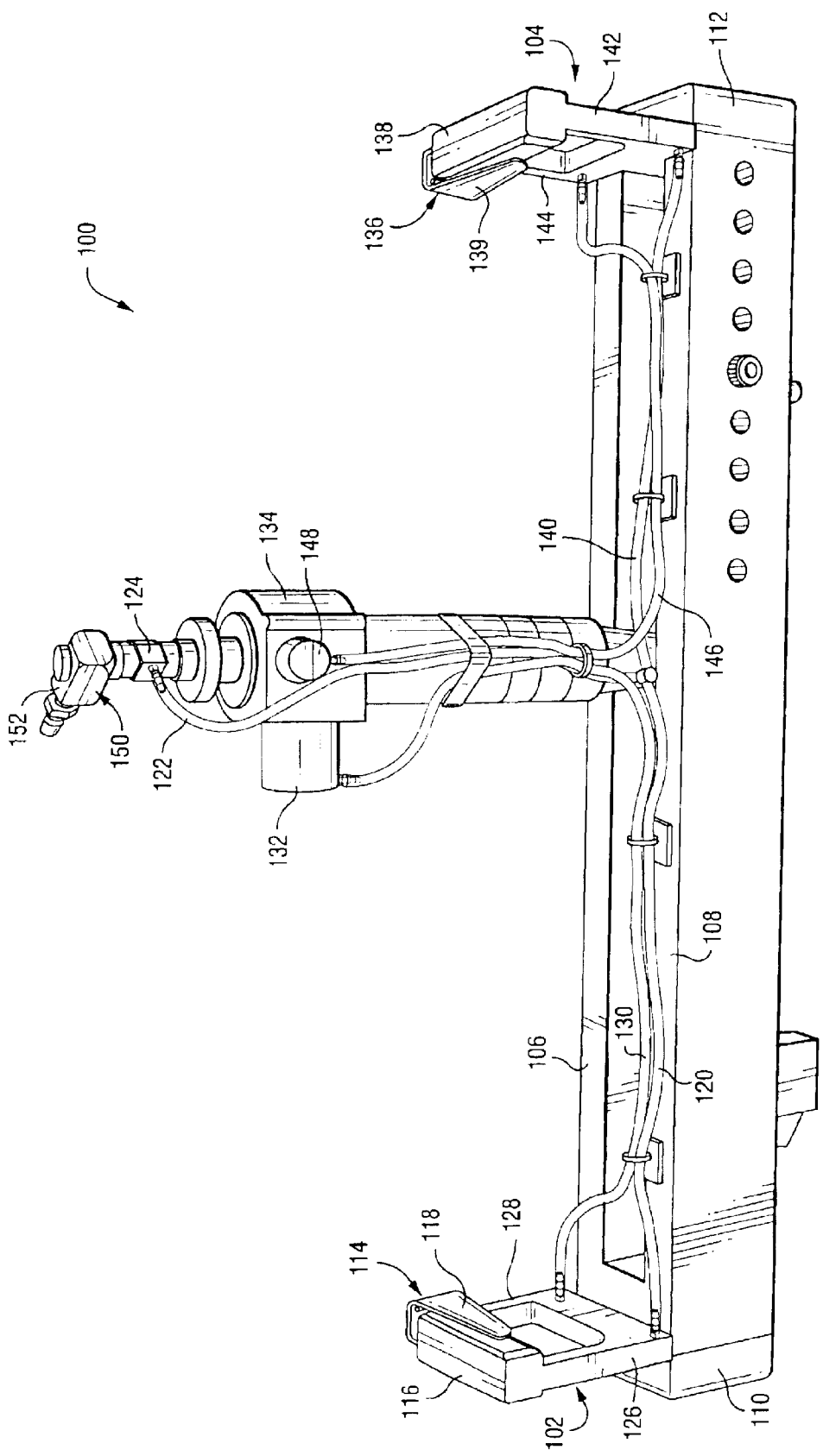
FIG. 5 is a perspective view of a wedge driving tool in accordance with another embodiment of the invention.
Figure 6:
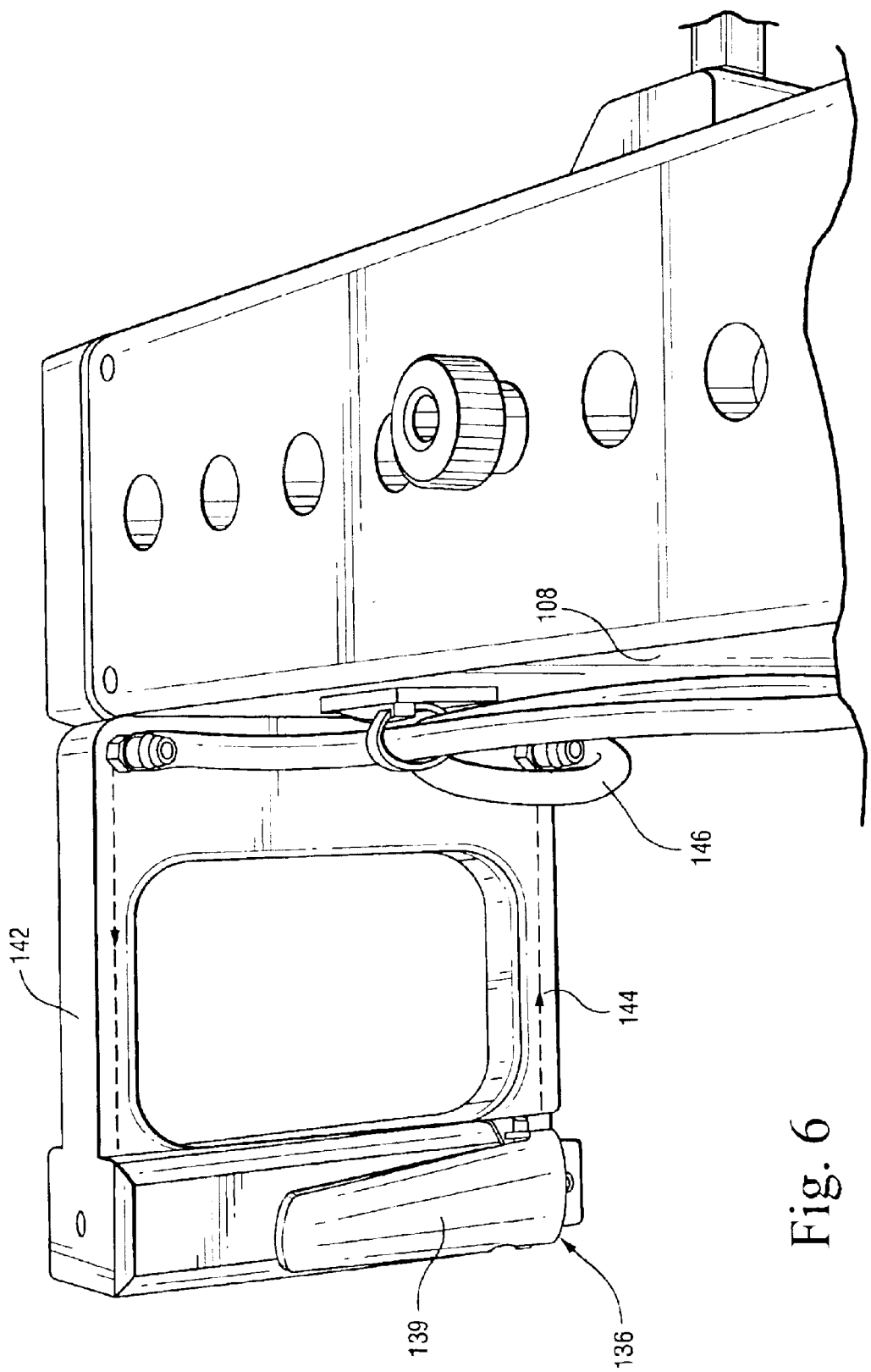
FIG. 6 is an enlarged partial perspective view of a portion of the tool shown in FIG. 5.

Turning now to FIG. 5, a preferred embodiment of the tool 100 is shown. Tool 100 is of similar construction and operation as described above, except as noted below. A pair of handles 102, 104 are provided at respective opposite ends of the tool 100, i.e., to the ends of rail members 106, 108 adjacent end caps 110, 112.

Handle 102 is fitted with a first trigger 114 on the inside surface of the horizontal handle cross member 116. Trigger 114 is a conventional, spring-loaded construction and includes a pneumatic valve switch (not shown) that opens when the pivotally mounted trigger lever 118 is pulled inwardly toward the cross member 116 (release of the spring loaded lever 118 causes the switch to close automatically).

The trigger 114 is an on/off trigger that receives air under pressure from a supply tube 120 that is connected to a tap-off tube 122 in the air inlet fitting 124. The air in tube 120 connects to a bore or passage (not shown) in one of the handle legs 126 and connects to the trigger switch. Air out of the trigger 114 flows through a bore or passage (not shown) in the other of the handle legs 128 and flows through tube 130 to an on/off solenoid 132 mounted on the air wrench 100 via surrounding saddle 134.

A second trigger 136 is fitted to the inside surface of the horizontal cross-member 138 of the second handle 104.

Trigger 136 is similar in construction to trigger 114 and includes a spring-loaded lever 139, but controls the direction of rotation of the air wrench socket (similar to socket 64 in FIGS. 2–4), i.e., the trigger 136 is a forward/reverse trigger. Air under pressure is supplied via tube 140 from the tap-off tube 122 (tubes 120 and 140 connect to a tee that connects to the tap-off tube 122). Air in tube 140 flows through a bore or passage (not shown) in handle leg 142 and connects to the trigger switch. Air out of the trigger 136 flows through a bore or passage (not shown) in the other handle leg 144 and flows through a tube 146 to a forward/reverse solenoid 148 secured to the air wrench via saddle 134.

With this arrangement, the operator can manipulate the tool into place, actuate the on/off trigger 114 to supply air to the air wrench and, while holding the trigger 120 in the "on" position, manipulate trigger 136 as necessary to cause the air wrench socket to rotate in the forward or reverse direction.

In this embodiment, a swivel fitting 150 is employed for connection to an air supply hose (not shown) at one end and to the fitting 124 at an opposite end thereof. Fitting 150 includes a 90° elbow that permits the hose connector end 152 of the fitting to be rotated through a full 360°. In this way, the fitting and hose can be pointed away from the operator to thereby avoid interference with manipulation of the tool.

FIG. 7 shows a drive block 154 that may be used in place of drive block 80, particularly when installing the end slide, i.e., the last or axially outermost slide. In some instances, it is desirable to insert the stator slide axially beyond the end of the stator wedge. To this end, block 154 is fitted with an adapter 156 with a projection 158 and stop shoulder 160. In use, the projection 158 will engage the slide and drive it axially inwardly of the stator wedge, until the wedge is engaged by the stop shoulder 160.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for driving a stator slide under a stator wedge within a radial slot of a stator core comprising:
    a frame including a pair of elongated rail members, said frame provided with a pair of handles at respective opposite ends of said elongated rail members;
    a force application cart located between said rail members, said force application cart having a drive block thereon;
    a drive connected to said frame, substantially intermediate opposite ends of said frame, said drive having an on/off trigger located on one of said handles; and
    a lead screw threadably engaged at one end with said force application cart and connected at an opposite end to said drive such that said drive rotates said lead screw when actuated; wherein, in use, rotation of said lead screw causes axial movement of said force application cart and said drive block along said elongated rail members.

2. The tool of claim 1 and further comprising a pin for locating the tool relative to the stator slide, and for establishing a reaction point for forces applied by said drive block to said stator slide.

3. The tool of claim 1 wherein said drive comprises an air wrench secured to said frame and operatively connected to said lead screw.

4. The tool of claim 2 wherein said pin is adjustable relative to said frame.

5. The tool of claim 1 wherein said drive block is provided with a vertical drive face adapted to engage an edge of a stator slide.

6. The tool of claim 1 and further comprising thrust bearings forward and rearward of said force application cart.

7. The tool of claim 3 including an air hose for supplying air to said air wrench, wherein said hose is connected to said air wrench with a swivel fitting.

8. The tool of claim 7 wherein said swivel fitting includes a 90° elbow.

9. The tool of claim 1 and further wherein said drive includes a forward/reverse trigger located on the other of said handles, said forward/reverse trigger adapted to control direction of rotation of the lead screw.

10. A tool for driving a stator slide under a stator wedge within a radial slot of a stator core comprising:
    a frame including a pair of elongated rail members, said frame provided with a pair of handles at respective opposite ends of said elongated rail members;
    a force application cart located between said rail members, said force application cart having a drive block thereon;
    an air wrench connected to said frame, substantially intermediate opposite ends of said frame, said air wrench having an on/off trigger located on one of said handles; and
    a lead screw threadably engaged at one end with said force application cart and connected at an opposite end to said air wrench such that said air wrench rotates said lead screw when actuated; wherein, in use, rotation of said lead screw causes axial movement of said force application cart and said drive block along said elongated rail members;
    and further including an air hose for supplying air to said air wrench, wherein said hose is connected to said air wrench with a swivel fitting.

11. The tool of claim 10 and further comprising a pin for locating the tool relative to the stator slide, and for establishing a reaction point for forces applied by said drive block to said stator slide.

12. The tool of claim 11 wherein said pin is adjustable relative to said frame.

13. The tool of claim 10 wherein said drive block is provided with a vertical drive face adapted to engage an edge of a stator slide.

14. The tool of claim 13 and further comprising thrust bearings forward and rearward of said force application cart.

15. The tool of claim 10 and further wherein a forward/reverse trigger is located on the other of said handles for controlling direction of rotation of the lead screw.

16. A tool for driving a stator slide under a stator wedge within a radial slot of a stator core comprising:
    a frame including a pair of elongated rail members, said frame provided with a pair of handles at respective opposite ends of said elongated rail members;
    a force application cart located between said rail members, said force application cart having a drive block thereon;
    a drive connected to said frame, substantially intermediate opposite ends of said frame, said drive having an on/off trigger located on one of said handles, and further wherein said drive includes a forward/reverse trigger located on the other of said handles, said forward/reverse trigger adapted to control direction of rotation of the lead screw; and a lead screw threadably engaged at one end with said force application cart and connected at an opposite end to said drive such that said drive rotates said lead screw when actuated; wherein, in use, rotation of said lead screw causes axial movement of said force application cart and said drive block along said elongated rail members.

* * * * *